US006703620B1

(12) United States Patent
Campbell

(10) Patent No.: US 6,703,620 B1
(45) Date of Patent: Mar. 9, 2004

(54) ROTATIONAL-TRANSLATIONAL FOURIER IMAGING SYSTEM

(75) Inventor: Jonathan W. Campbell, Harvest, AL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 517 days.

(21) Appl. No.: 09/246,193

(22) Filed: Dec. 30, 1998

Related U.S. Application Data

(60) Provisional application No. 60/109,243, filed on Nov. 19, 1998.

(51) Int. Cl.[7] .................................................. G01T 7/00

(52) U.S. Cl. ................................ 250/390.1; 250/336.1; 250/363.1; 250/390.01; 250/505.1

(58) Field of Search ......................... 250/336.1, 390.01, 250/390.1, 505.1, 363.1

(56) References Cited

U.S. PATENT DOCUMENTS 3,682,283 A * 8/1972 Sato ........................... 192/141
5,625,192 A * 4/1997 Oda et al. ................ 250/363.1
5,844,700 A * 12/1998 Jeganathan et al. ............ 359/7

OTHER PUBLICATIONS

Jonathan W. Campbell, Imaging the Sun In Hard X–Rays Using Fourier Telescopes, *NASA Technical Memorandum*, NASA TM 108390, Jan. 1993.

Jonathan W. Campbell, A Single Grid Pair Fourier Telescope for Imaging the Sky in Hard X–rays and Gama Rays, *SPIE*, vol. 2808, p. 546–554, 1996.

* cited by examiner

*Primary Examiner*—David Porta
*Assistant Examiner*—Shun Lee
(74) *Attorney, Agent, or Firm*—Jerry L. Seemann

(57) ABSTRACT

This invention has the ability to create Fourier-based images with only two grid pairs. The two grid pairs are manipulated in a manner that allows (1) a first grid pair to provide multiple real components of the Fourier-based image and (2) a second grid pair to provide multiple imaginary components of the Fourier-based image. The novelty of this invention resides in the use of only two grid pairs to provide the same imaging information that has been traditionally collected with multiple grid pairs.

7 Claims, 4 Drawing Sheets

ROTATIONAL-TRANSLATIONAL FOURIER IMAGING SYSTEM

CROSS-REFERENCE TO A RELATED APPLICATION

This application claims the benefit of U.S. Provisional Application No. 60/109,243 filed Nov. 19, 1998.

STATEMENT REGARDING FEDERALLY-SPONSORED RESEARCH OR DEVELOPMENT

The invention described in this patent was made by an employee of the United States Government and may be manufactured and used by or for the Government for governmental purposes without the payment of any royalties.

BACKGROUND OF THE INVENTION

1. Field of the Invention

In general, this invention pertains to imaging systems or telescopes. Specifically, this invention pertains to Fourier imaging systems or telescopes.

2. Background Information

The theory and capability of Fourier telescopes is well understood. See J. W. Campbell, Imaging the Sun in Hard X-Rays Using Fourier Telescopes, NASA Technical Memorandum, NASA TM-08390 (January 1993). However, the cost of a Fourier telescope based on a traditional design can be prohibitive because of the expense associated with the physical production of a single grid pair and the need for numerous grid pairs (e.g., 48 grids were used in a basic telescope design in Campbell, NASA TM-108390 at 109). While single and double grid pair Fourier telescopes have been theorized (see J. W. Campbell, A Single Grid Pair Fourier Telescope for Imaging the Sky in Hard X-rays and Gamma Rays, 2808 SPIE Proc. 546 (1996)), a device for implementing such telescopes has never been created. In addition, this single grid pair theory only contemplated the collection of data at discrete, predetermined points in the available spectrum.

SUMMARY OF THE INVENTION

This invention has the ability to create Fourier-based images with only two grid pairs. (Use of one grid pair is also possible with this invention.) The two grid pairs are manipulated in a manner that allows (1) a first grid pair to provide multiple real components of the Fourier-based image and (2) a second grid pair to provide multiple imaginary components of the Fourier-based image. The novelty of this invention resides in the use of only two grid pairs to provide the same imaging information that has been traditionally collected with multiple grid pairs. Additional novelty resides in the fact that this invention has the ability to image continuously across the available spectrum.

An object of this invention is to provide a Fourier-based system for imaging atomic particles (e.g., neutrons) and electromagnetic radiation (e.g., gamma rays, x-rays).

Another object of this invention is to provide a Fourier-based system for imaging atomic particles and electromagnetic radiation with one grid pair.

A further object of this invention is to provide a Fourier-based system for imaging atomic particles and electromagnetic radiation with two grid pairs.

A still further object of this invention is to provide a Fourier-based system for imaging atomic particles and electromagnetic radiation capable of imaging over the entire available spectrum rather than imaging at discrete, predetermined intervals in the spectrum.

BRIEF DESCRIPTION OF THE DRAWINGS

The following discussion of the invention will refer to the accompanying drawings in which.

DESCRIPTION OF THE PREFERRED EMBODIMENT

Figure 1:
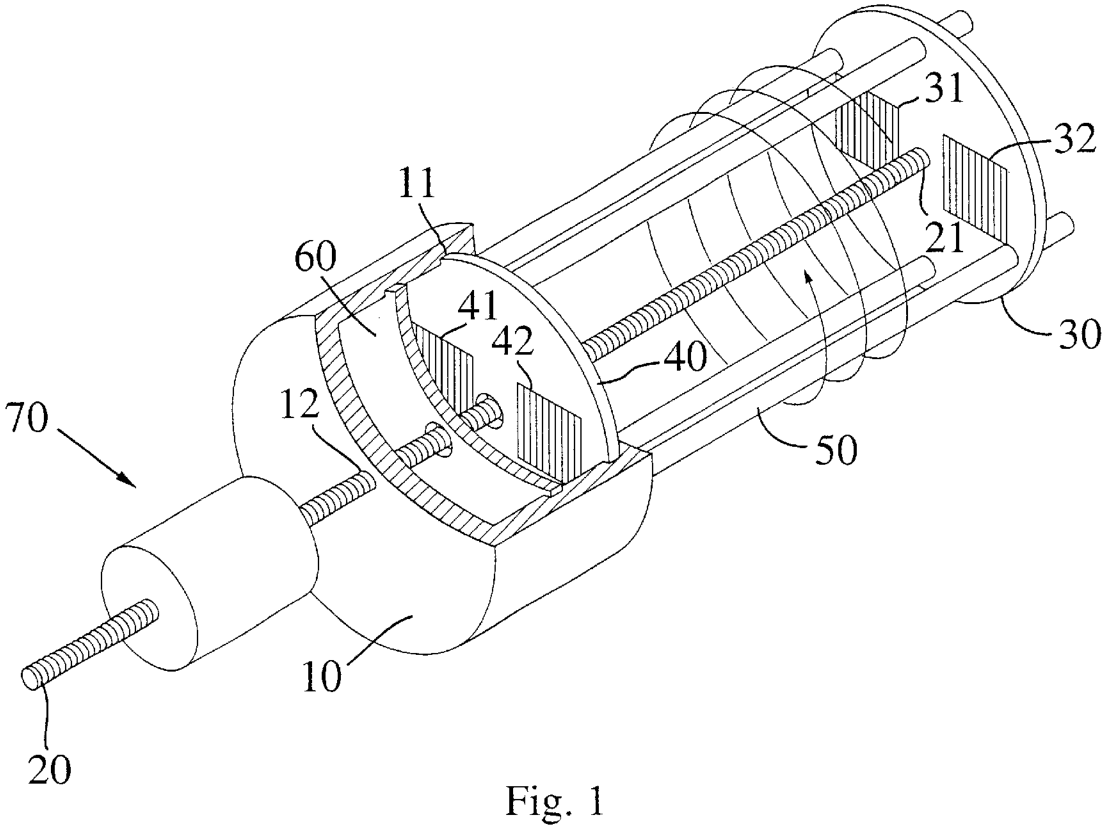
FIG. 1 represents a perspective view of the Rotational-Translational Fourier Imaging System.

Referring to FIG. 1, the preferred embodiment of this invention comprises a frame (10), a drive rod (20), a first disk (30), a second disk (40), a connecting rod (50), a detector (60), and a means for simultaneously rotating and translating the drive rod (70).

The frame (10) has a disk guide (11) and a rod guide (12). The drive rod (20) is mounted in the rod guide (12) of the frame (10). The first disk (30) has a first real grid (31) and a first imaginary grid (32) and is attached to an end (21) of the drive rod (20). The second disk (40) has a second real grid (41) aligned with the first real grid (31) and a second imaginary grid (42) aligned with the first imaginary grid (32) The second disk (40) is connected to the first disk (30) via a connecting rod (50) that is attached to the second disk (40) and slidably mounted to the first disk (30). In the preferred embodiment, a plurality of connecting rods (50) are used. The second disk (40) is rotationally guided by the disk guide (11) in the Frame (10). The detector (60) is mounted to the frame (10) and is aligned with the real grid pair (31, 41) and the imaginary grid pair (32, 42).

The means for simultaneously rotating and translating the drive rod (70) can be accomplished in a variety of ways. In the first alternative embodiment of FIG. 2, the drive rod (20) and the rod guide (12) are threaded together such that rotation of the drive rod (20) also provides translation of the drive rod (20). The drive rod (20) also has a slot (22) that coincides with a spline (71) on a tubular motor shaft (72) of a motor (73) . The motor (73) is attached to the frame (10). When the threaded drive rod (20, is placed within the tubular shaft (72) of the motor (73), rotational torque can be transferred from the motor (73) to the drive rod (20) and the stationary motor assembly (73) can accommodate translation of the drive rod (20).

Figure 3:
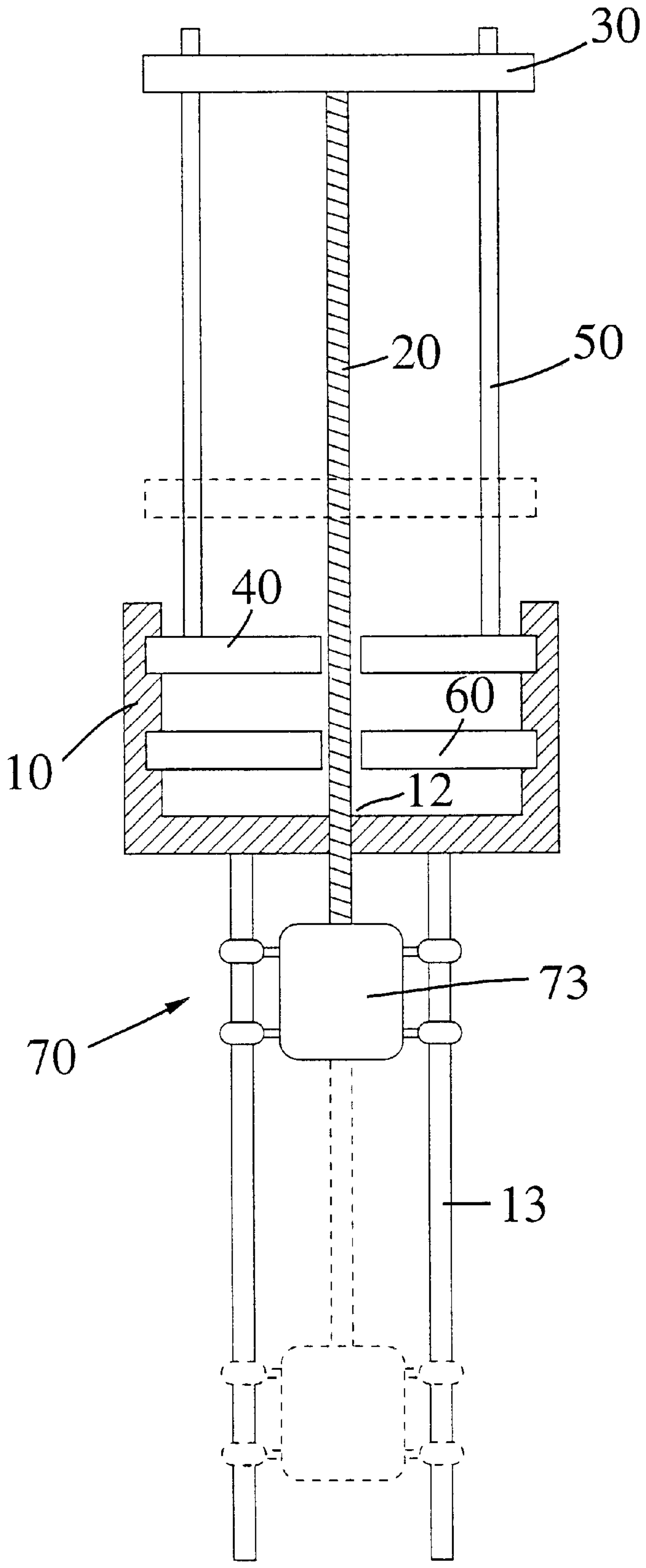
FIG. 3 represents an elevation view of the second alternative means for providing rotation and translation for the Rotational-Translational Fourier Imaging System.

In the second alternative embodiment of FIG. 3, the threaded drive rod (20), without the slot (22), is attached directly to the motor (73). The motor is slidably mounted to a rail (13) that is attached to the frame (10). In this embodiment, translation of the drive rod (20) is accommodated by movement of the motor (73) along the rail (13).

In the forgoing two alternative embodiments, rotation and translation of the drive rod (20) are related by the thread pitch (i.e., threads per inch). Thus, one rotation of the drive rod (20) provides a predetermined amount of translation of the drive rod (20).

Figure 4:
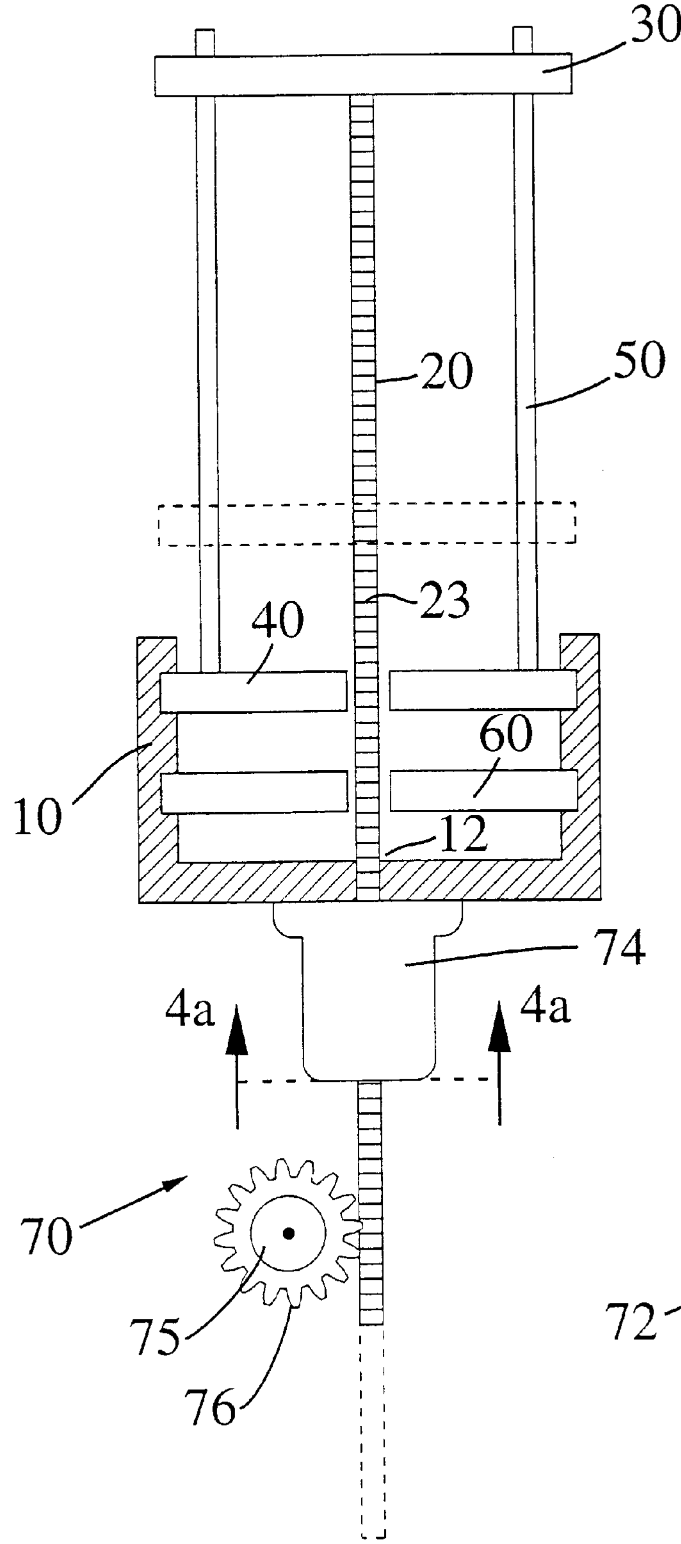
FIG. 4 represents an elevation view of the third alternative means for providing rotation and translation for the Rotational-Translational Fourier Imaging System.
Figure 4A:
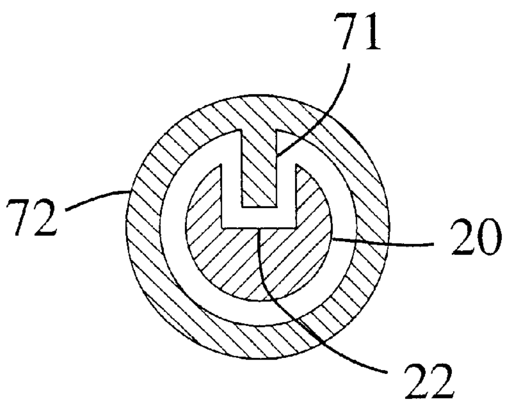
FIG. 4*a* is a cross-sectional view taken along line 4*a*—4*a* of FIG. 4.

In the third alternative embodiment of FIG. 4, rotation and translation of the drive rod (20) can be controlled independently. This embodiment is similar to the first alternative embodiment described above except that the drive rod (20) has a plurality of transverse grooves (23) (i.e., threads without the spiral) rather than threads. Consequently, the drive rod (20) and the rod guide (12) are not threaded together. In addition, a first motor (74) provides rotation of the drive rod (20) via the slot (22) and spline (71) configuration and a second motor (75) provides translation of the drive rod (20) via a drive gear (76) that engages the transverse grooves (23) on the drive rod (20).

Figure 2:
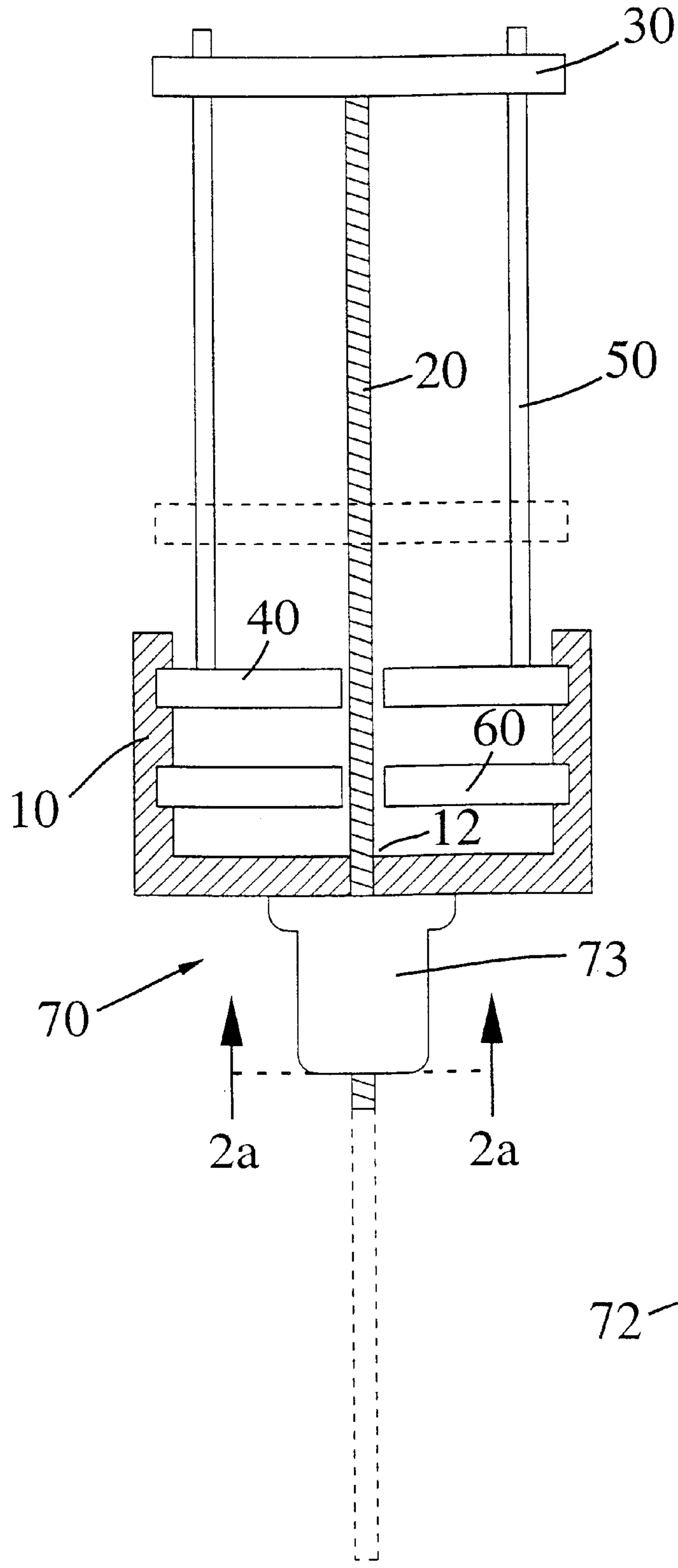
FIG. 2 represents an elevation view of the first alternative means for providing rotation and translation for the Rotational-Translational Fourier Imaging System.
Figure 2A:
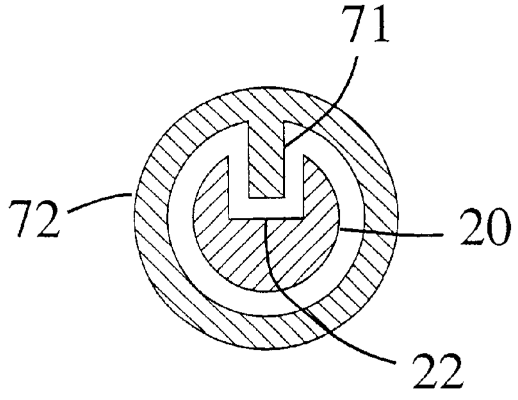
FIG. 2*a* is a cross-sectional view taken along line 2*a*—2*a* of FIG. 2.

The operation of the foregoing invention is straightforward. The motor provides rotation of the first grid pair on the first disk via the drive rod. Synchronized rotation of the second grid pair on the second disk is provided by the plurality of rods connecting the first disk to the second disk. Translation is provided either in relation to rotation (as shown in FIGS. 2 and 3) or independently of rotation (as shown in FIG. 4). Obviously, the direction of the translation depends on direction of the motor. By detecting data at multiple angular positions of and multiple distances between the first grid pair and the second grid pair, the two grid pairs of this invention can provide the same information that was previously provided by using multiple grid pairs.

What is claimed is:

1. An apparatus for imaging photons and neutrons, comprising:

a first plate having an axis of rotation, said first plate having a first grid;

a second plate having an axis of rotation coinciding with the axis of rotation of said first plate, said second plate having a second grid, said second grid is aligned with said first grid;

means for simultaneously rotating said first and second plate and translating said first plate relative to said second plate; and a detector, said detector is aligned with said axes of rotation.

2. An apparatus for imaging photons and neutrons, comprising:

a first plate having an axis of rotation, said first plate having a first real grid and a first imaginary grid;

a second plate having an axis of rotation coinciding with the axis of rotation of said first plate, said second plate having a second real grid aligned with said first real grid and a second imaginary grid aligned with said first imaginary grid;

means for simultaneously rotating said first and second plate and translating said first plate relative to said second plate; and a detector, said detector is aligned with said axes of rotation.

3. An apparatus for imaging photons and neutrons, comprising:

a frame, said frame having a disk guide and a rod guide;

a drive rod mounted in said rod guide of said frame, said drive rod having an end;

a first disk having a first real grid and a first imaginary grid, said first disk is attached to said end of said drive rod;

a second disk having a second real grid aligned with said first real grid whereby a real grid pair is formed and having a second imaginary grid aligned with said first imaginary grid whereby an imaginary gird pair is formed, said second disk is rotationally guided by said disk guide in said frame;

a connecting rod slidably mounted to said first disk and attached to said second disk;

a detector aligned with said real grid pair and said imaginary grid pair and mounted to said frame; and a means for simultaneously rotating and translating said drive rod.

4. An apparatus for imaging photons and neutrons as recited in claim 3 wherein said drive rod and said rod guide in said frame are threaded together.

5. An apparatus for imaging photons and neutrons as recited in claim 4, wherein said threaded drive rod has a slot and wherein said means for simultaneously rotating and translating said drive rod comprises a motor having a tubular shaft with a spline aligned with said slot such that said motor rotates said threaded drive rod as said threaded drive rod translates through said tubular motor shaft.

6. An apparatus for imaging photons and neutrons as recited in claim 4, wherein said means for simultaneously rotating and translating said drive rod, comprises:

a rail attached to said frame; and a motor slidably mounted on said rail of said frame, said motor having a shaft attached to said drive rod.

7. An apparatus for imaging photons and neutrons as recited in claim 3, wherein said drive rod has a plurality of transverse grooves and a slot and wherein said means for simultaneously rotating and translating said drive rod comprises:

a first motor attached to said frame, said first motor having a tubular shaft with a spline aligned with said slot such that said motor rotates said grooved drive rod and said grooved drive rod translates through said tubular motor shaft; and a second motor attached to said frame, said second motor having a drive gear engaged with said transverse grooves on said drive rod such that said second motor translates said drive rod.

* * * * *